(12) United States Patent
Tin

(10) Patent No.: US 10,012,496 B2
(45) Date of Patent: Jul. 3, 2018

(54) MULTISPECTRAL BINARY CODED PROJECTION USING MULTIPLE PROJECTORS

(71) Applicant: CANON KABUSHIKI KAISHA, Tokyo (JP)

(72) Inventor: Siu-Kei Tin, Milpitas, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 314 days.

(21) Appl. No.: 14/927,248

(22) Filed: Oct. 29, 2015

(65) Prior Publication Data

US 2017/0124715 A1    May 4, 2017

(51) Int. Cl.
| | |
|---|---|
| *H04N 9/47* | (2006.01) |
| *H04N 7/18* | (2006.01) |
| *G01B 11/22* | (2006.01) |
| *H04N 9/04* | (2006.01) |
| *G01B 11/25* | (2006.01) |
| *G06T 7/514* | (2017.01) |
| *G06T 7/521* | (2017.01) |
| *G06T 7/55* | (2017.01) |

(52) U.S. Cl.
CPC .......... *G01B 11/22* (2013.01); *G01B 11/2509* (2013.01); *G06T 7/514* (2017.01); *G06T 7/521* (2017.01); *G06T 7/55* (2017.01); *H04N 9/045* (2013.01); *H04N 2209/047* (2013.01)

(58) Field of Classification Search
USPC ......................................................... 348/136
See application file for complete search history.

(56) References Cited

U.S. PATENT DOCUMENTS

| | | | |
|---|---|---|---|
| 4,900,940 A | 2/1990 | Nakamura | 250/356 |
| 6,341,016 B1 * | 1/2002 | Malione | G01B 11/2509 345/419 |
| 7,349,104 B2 * | 3/2008 | Geng | A61B 5/1077 348/E5.029 |
| 7,382,471 B2 | 6/2008 | Franke et al. | 356/604 |

(Continued)

OTHER PUBLICATIONS

Gupta, M., Agrawal, A., Veeraraghavan, A. and Narasimhan, S., Structured light 3D scanning in the presence of global illumination, CVPR 2011.

(Continued)

*Primary Examiner* — Chikaodili E Anyikire
(74) *Attorney, Agent, or Firm* — Fitzpatrick, Cella, Harper & Scinto

(57) ABSTRACT

A method of measuring a depth map for an object or a material property of an object involves positioning multiple projectors at respectively multiple angular positions relative to an object. Each of the projectors comprises color channels whose colors differ from that of other projectors. An image capture device is positioned relative to the multiple projectors. A combined color pattern is projected onto the object using the multiple projectors. Each projector projects a color striped pattern whose resolution differs from that of others of the projectors and the resolution of the color striped pattern is related to the angular position of the projector. An image of the object is captured with the combined color pattern using the image capture device and a depth map or a material property of the object is recovered by calculations using the captured image.

14 Claims, 12 Drawing Sheets

(56) References Cited

U.S. PATENT DOCUMENTS

| | | | |
|---|---|---|---|
| 7,388,678 B2* | 6/2008 | Forster | G01B 11/2518 356/603 |
| 8,462,357 B2 | 6/2013 | Rodrigue et al. | 356/610 |
| 8,509,501 B2 | 8/2013 | Hassebrook et al. | 382/125 |
| 8,520,058 B2 | 8/2013 | Rodrigue et al. | 348/46 |
| 8,730,309 B2* | 5/2014 | Wilson | G06F 3/011 348/51 |
| 2008/0095468 A1* | 4/2008 | Klemmer | H04N 9/3147 382/285 |
| 2009/0238449 A1* | 9/2009 | Zhang | G01B 11/2536 382/165 |
| 2012/0287247 A1* | 11/2012 | Stenger | H04N 13/0253 348/47 |
| 2014/0028800 A1* | 1/2014 | Tin | G01N 21/55 348/46 |

OTHER PUBLICATIONS

Manabe, Y., Parkkinen, J., Jaaskelainen, T. and Chihara, K., Three Dimensional Measurement using Color Structured Patterns and Imaging Spectrograph, ICPR 2002.

Kim, Harvey, Kittle, Rushmeier, Dorsey, Prum and Brady, 3D Imaging Spectroscopy for Measuring Hyperspectral Patterns on Solid Objects, SIGGRAPH 2012.

* cited by examiner

MULTISPECTRAL BINARY CODED PROJECTION USING MULTIPLE PROJECTORS

FIELD

The present disclosure relates to illumination of an object with structured light and measurement of light reflected therefrom for purposes which include derivation of a three-dimensional (3D) measurement of the object, such as depth and/or contours of the object, or for purposes which include measurement of a material property of the object.

BACKGROUND

In the field of 3D scanning using structured light, it has been considered to use structured light patterns in the form of binary coded patterns, which are typically black and white patterns.

SUMMARY

Binary coded patterns are robust to depth discontinuities, but multiple patterns are required. For example, to project Gray codes in 10 bits (10-bit depth resolution), a minimum of 10 projected binary (that is, black and white) patterns are required. This makes high-speed 3D scanning of dynamic scenes difficult. Combining 3-bit planes into one color pattern using the 3 channels of an RGB projector can reduce the number of projected patterns by a factor of 3, but this reduction is still not sufficient to enable real-time capture of dynamic scenes or for applications where fast detection of objects is desired.

It has been considered to perform multispectral binary coded projection using a single multichannel projector. The approach generally involves measuring the depth of a scene or a material property of an object using a multichannel projector with a number of channels at predetermined wavelengths and a multispectral camera. The spectral sensitivities of the camera channels at the characteristic peak wavelengths of the projector channels form a well-conditioned band-diagonal matrix.

This method of multispectral binary coded projection enjoys the same robustness to depth discontinuities as binary coded patterns, such as Gray code, while avoiding an unduly excessive number of projected patterns. Under the right circumstances, one-shot depth capture is theoretically possible.

However, one difficulty with the foregoing approach is that a single multichannel projector with a high number of channels, e.g. 10 channels, is ordinarily required. Such projectors can be difficult to procure and require elaborate setup and precise alignment.

The foregoing difficulty is addressed by using multiple low-number-of-channels projectors each projecting a pattern onto an object at a different resolution. The patterns from all the projectors combine to form a combined color pattern, and an image of the combined color pattern can be used to calculate a depth map for the object or to estimate a material property of the object.

By using multiple low-number-of-channels projectors each projecting a pattern onto an object at a different resolution, it is ordinarily possible to achieve the same benefits of multispectral binary coded projection as when using a single high-number-of-channels projector.

Thus, in an example embodiment described herein, a method of measuring a depth map for an object or a material property of an object includes positioning multiple projectors at respectively multiple angular positions relative to the object. Each of the projectors includes color channels whose colors differ from that of the other projectors. An image capture device is positioned relative to the multiple projectors. The image capture device includes a multispectral capture device having a capture sensitivity spectral range that includes the spectral range of the totality of colors of the multiple projectors. A first combined color pattern is projected onto the object using the multiple projectors. Each projector projects a color striped pattern whose resolution differs from that of the other projectors, and the resolution of the color striped pattern is related to the angular position of the projector. An image of the object is captured with the first combined color pattern using the image capture device, and the depth map or the material property of the object is recovered by calculations using the captured image.

In one aspect, the resolution of a color striped pattern is characterized by a minimum stripe width such that a small minimum stripe width corresponds to a high resolution pattern and a large minimum stripe width corresponds to a low resolution pattern. In another aspect, the resolution of the color striped pattern a projector projects is inversely related to the angle between the projector and the camera.

Also, in one example embodiment, a second combined color pattern is projected onto the object using the multiple projectors, the second pattern differing from the first pattern. Once again, each projector projects a color striped pattern whose resolution differs from that of others of the projectors, and the resolution of the color striped pattern is related to the angular position of the projector. A second image of the object illuminated by the second pattern is captured using the image capture device. The depth map of the object or material property of the object is recovered by analyzing the captured first image and the captured second image.

In one example aspect of this embodiment, the second combined color pattern is inverted in color values relative to the first combined color pattern.

Furthermore, in one aspect, each projector projects a periodic color striped pattern that partitions depth values along a line emanating from the image capture device into periods of ranges of depth values, in which a range of depth values for a projector projecting a periodic color striped pattern is contained in a full period of ranges of depth values for one of the other projectors projecting a periodic color striped pattern at a higher resolution.

In one further aspect, the depth map of the object is recovered by determining a range of depth values corresponding to a stripe position in the projector projecting the highest resolution color striped pattern. In some aspects, determining a range of depth values corresponding to a stripe position in the projector projecting the highest resolution color striped pattern includes recursively determining a range of depth values corresponding to a stripe position in a projector projecting a lower resolution color striped pattern.

Additionally, in one aspect, the multiple projectors include at least first, second and third projectors. The first projector has spectrally relatively narrow color channels with at least three characteristic peak wavelengths $\lambda_1$, $\lambda_2$, $\lambda_3$, the second projector has spectrally relatively narrow color channels with at least three characteristic peak wavelengths $\lambda_4$, $\lambda_5$, $\lambda_6$, the third projector has spectrally relatively narrow color channels with at least three characteristic peak wavelengths $\lambda_7$, $\lambda_8$, $\lambda_9$, all of the $\lambda_i$'s are different, and the image capture device comprises at least nine color channels each with spectrally relatively broad capture sensitivity such that the combined capture sensitivity spectral range for all the color channels includes all of the $\lambda_i$'s.

In yet another example aspect, a material property of the object is recovered from the depth map by determining surface normal vectors from the depth map, calculating an empirical reflectance map from the determined surface normal vectors and the captured image, and fitting a reflectance model to the calculated empirical reflectance map so as to obtain an estimate of a material property parameter. In one example, the reflectance model being fitted is a bidirectional reflectance distribution function (BRDF) model and the fitted model parameter of the BRDF model provides an estimate of a material property of the object.

Some embodiments may be implemented as a method or methods according to any of the disclosure herein. Some embodiments may be implemented as an apparatus or apparatuses according to any of the disclosure herein. Representative embodiments of such apparatus may be implemented as one or more processors constructed to execute stored process steps together with memory which stores the process steps described herein for execution by the processor(s). Other representative embodiments of such apparatus may be implemented as units constructed to execute processes described herein, with such units, for example, being implemented by computer hardware in combination with software which when executed by the computer hardware causes the computer hardware to execute such processes. Some further embodiments may be implemented as non-transitory computer-readable storage media which retrievably stores computer-executable process steps which when executed by a computer cause the computer to execute such process steps.

This brief summary has been provided so that the nature of this disclosure may be understood quickly. A more complete understanding can be obtained by reference to the following detailed description and to the attached drawings.

DETAILED DESCRIPTION

Figure 1:
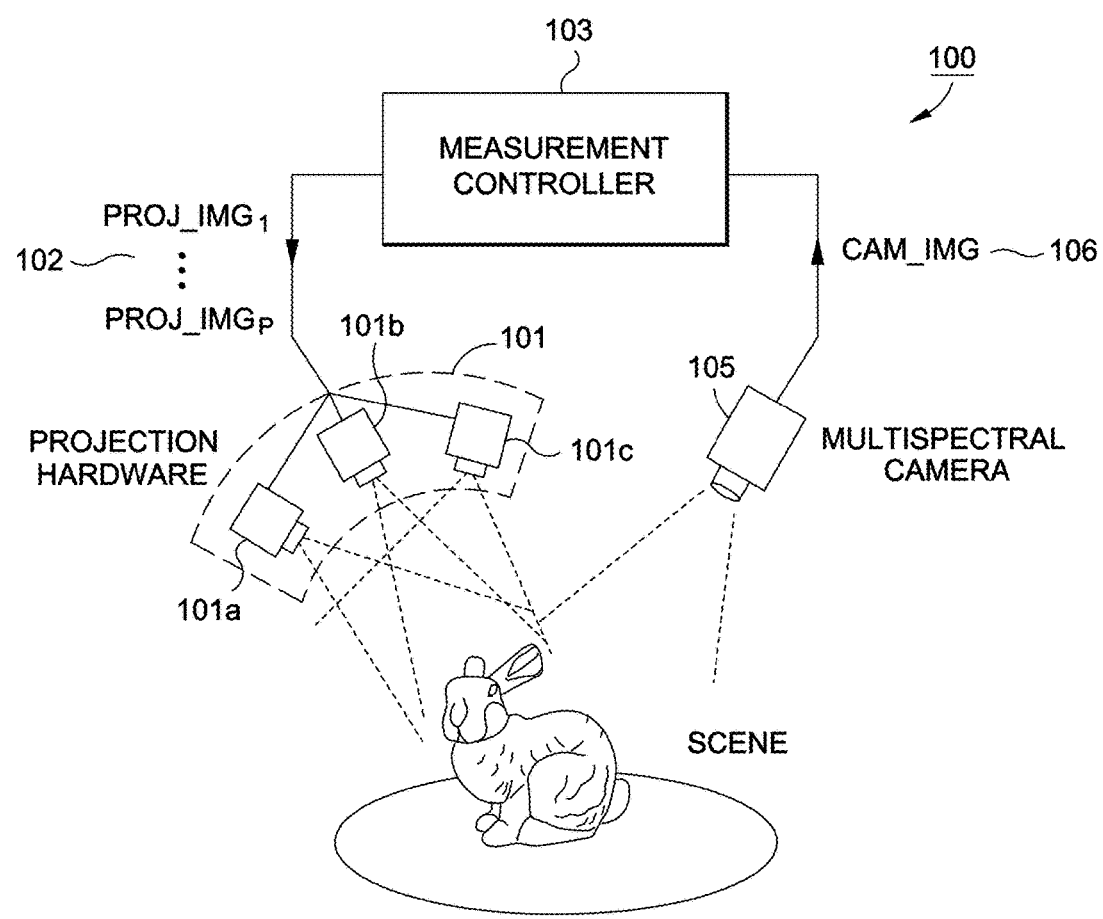
FIG. 1 is a view showing the setup of a multispectral binary coded projection system according to an example embodiment.

FIG. 1 is a view showing the setup of a multispectral binary coded projection system according to an example embodiment.

The multispectral binary coded projection system 100 includes projection hardware 101. Projection hardware 101 comprises P projectors where the ith projector ($1 \leq i \leq P$) has $N_i$ color channels. For the purpose of this disclosure, a projector, in addition to being a light source, is required to be able to accept digital image data and project the corresponding image onto an external surface (such as a projection screen or an object surface). In addition, the projected image is reasonably in focus if the external surface is within the depth of field of the projector. An example of a projector for the purpose of this disclosure is a DLP projector where focusing is achieved by lenses. Another example of a projector for the purpose of this disclosure is a laser projector where focusing is achieved by the coherent laser beams. In FIG. 1, three projectors 101a, 101b, 101c are shown for illustration, that is, P=3, but in the general case, P can be any number of projectors greater than one. In one embodiment, $N_i=3$ for all $1 \leq i \leq P$. That is, projection hardware 101 comprises 3-channel projectors. The ith projector is capable of accepting an $N_i$-channel binary image PROJ_$IMG_i$. Generally, an n-channel binary image is a stack of n binary images of the same pixel dimensions or pixel resolution. A 1-channel binary image, or simply binary image for brevity, is an image where each pixel takes either 0 or 1 as a pixel value. In other words, a binary image is a black and white image. Typically, each channel of an n-channel binary image can be considered a bit plane of an n-bit binary coded pattern. An example of an n-bit binary coded pattern is a vertical striped pattern where successive vertical pixel columns take values as determined by the n-bit Gray code. Another example of an n-bit binary coded pattern is a horizontal striped pattern where successive horizontal pixel rows take values as determined by the n-bit Gray code. The multichannel binary images PROJ_$IMG_1$, ..., PROJ_$IMG_N$ shown at reference numeral 102 are generated by a measurement controller 103 and transmitted to the projection hardware 101 for projecting onto an object in a scene. At the same time, a multispectral camera 105 with m channels is also controlled by the measurement controller 103 to capture an image having m channels, such as camera image CAM_IMG shown at reference numeral 106, with the captured image being captured synchronously with the projected patterns.

In some embodiments, each of the channels of the multiple projectors of projection hardware 101 is monochromatic (that is, of a single wavelength) or has a relatively narrow spectral band with a characteristic peak wavelength. In addition, the color corresponding to the spectral band of a channel differs from colors of the channels of others of the multiple projectors. In an example embodiment, the spectral sensitivity of each channel of the multispectral camera 105 responds to at most one wavelength of a channel of the multiple projectors of the projection hardware 101. The capture sensitivity spectral range of the multispectral camera, which is the total of the spectral ranges of all the channels of the multispectral camera, includes the spectral range of the totality of colors of the channels of the multiple projectors.

Figure 6:
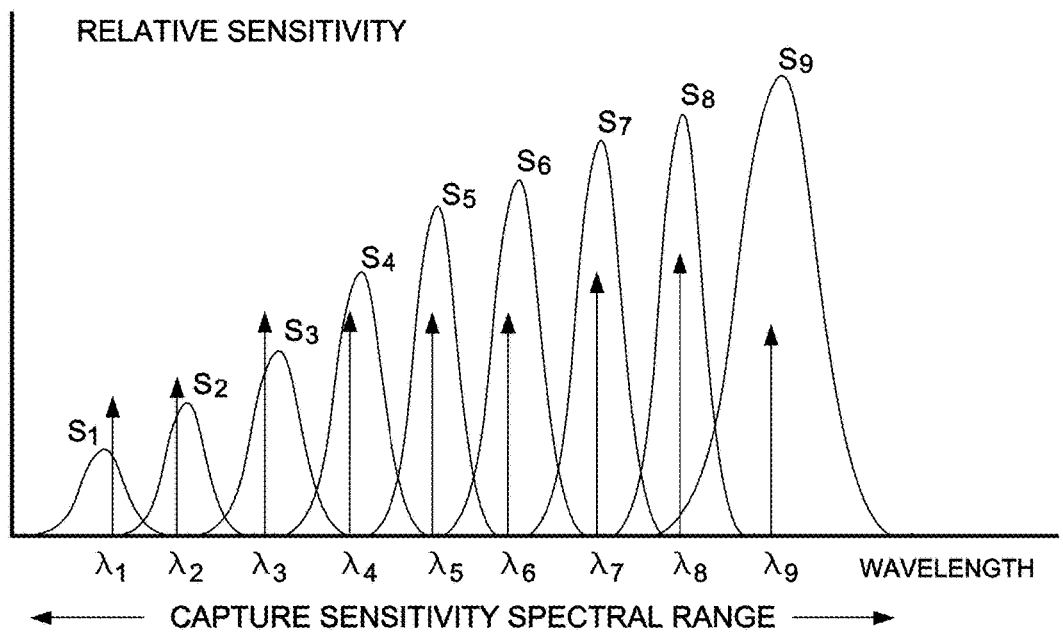
FIG. 6 is a view showing the relationship between relative sensitivity of a multispectral camera as compared to the characteristic peak wavelengths of light projected by three 3-channel projectors according to an example embodiment.

Refer to FIG. 6, which depicts an embodiment in which 3 projectors, each with 3 channels with respective groups of monochromatic (that is, of a single wavelength) primaries $(\lambda_1, \lambda_2, \lambda_3)$, $(\lambda_4, \lambda_5, \lambda_6)$ and $(\lambda_7, \lambda_8, \lambda_9)$, are used, along with a multispectral camera with 9 channels with respective spectral sensitivity curves $S_1, S_2, \ldots, S_9$. For the purpose of this disclosure, spectral sensitivity of a channel of a camera is the relative efficiency of detection of incident light or electromagnetic radiation for the sensor corresponding to the channel of the camera (e.g., red sensor for the red channel, green sensor for the green channel, blue sensor for the blue channel, etc.), as a function of wavelength of the incident light. A spectral sensitivity curve is a plot of spectral sensitivity against wavelength. Thus, the first projector comprises spectrally relatively narrow color channels with at least three characteristic peak wavelengths $\lambda_1, \lambda_2, \lambda_3$, the second projector comprises spectrally relatively narrow color channels with at least three characteristic peak wavelengths $\lambda_4, \lambda_5, \lambda_6$, the third projector comprises spectrally relatively narrow color channels with at least three characteristic peak wavelengths $\lambda_7, \lambda_8, \lambda_9$, all of the $\lambda_i$'s being different, and the image capture device comprises at least nine color channels each with spectrally relatively broad capture sensitivity such that the combined capture sensitivity spectral range for all the color channels includes all of the $\lambda_i$'s.

In some examples, the wavelengths of the monochromatic (that is, of a single wavelength) channels might be chosen to correspond to the wavelengths where the spectrum of the ambient light (for example, indoor lighting) has low intensities. For example, some of the wavelengths might lie in the NIR (near infra-red) spectrum, where typical indoor lighting contains low spectral constituents of NIR light. In one example, the projection hardware 101 comprises monochromatic (that is, of a single wavelength) laser sources. In another example, the projection hardware 101 might comprise monochromatic (that is, of a single wavelength) LED sources.

In some instances, some channels of the projection hardware 101 are not monochromatic, but are nevertheless relatively narrow banded such that none of the channels overlaps in spectrum with other channels, and the spectral sensitivity of each channel of the multispectral camera 105 responds to at most one channel of the projection hardware 101.

The projected binary images 102, depicted in the FIG. 1 embodiment as $PROJ\_IMG_1, PROJ\_IMG_2, \ldots, PROJ\_IMGp$, might be based on Gray code. Gray code is advantageous over other more naïve binary codes, such as the natural binary code, because adjacent Gray codes differ only in one bit. In the event of a recovery error for the Gray code, it is likely that the error will be limited in only one bit plane. In other words, the 3D reconstruction error tends to be lower with the Gray code.

Alternatively, other binary codes, including the natural binary codes, may be used, for example, in an embodiment where the operating environment and/or scene can be controlled so as to reduce recovery errors of the binary codes.

In conventional use of Gray codes in 3D scanning, it has been considered that when capturing a scene illuminated with binary coded projected patterns, the scene is captured by a grayscale camera. Analysis of the captured images then recovers the Gray code at each scene point, from which the depth map can be recovered by a technique based on triangulation.

In one example described herein, a multispectral camera with m channels is used, and in addition $$m \geq \sum_{i=1}^{P} N_i, \text{ e.g., } m = \sum_{i=1}^{P} N_i.$$

Each channel gives rise to a grayscale image similar to the conventional Gray code, but with the m channel multispectral camera of this example, there are m different channels captured as compared to the single channel captured with a grayscale camera. In other words, the captured m-channel multispectral image can be considered to be m grayscale images. For the purpose of this disclosure, a grayscale image is a digital image with one color channel (interpreted as "gray") where each pixel takes a pixel value from a set of discrete scalar values, such as 0, 1, ..., 255 or 0, 1, ..., 65535. To recover the binary code associated with each scene point, it may be necessary to convert each grayscale image to a binary image, a process called binarization of a grayscale image. For each scene point, binarization results in a sequence of m bits, that is, 0 and 1's. Because each of the m channels of the multispectral camera 105 responds to at most one wavelength of a channel of the multiple projectors of the projection hardware 101, the m bits can be grouped into P groups corresponding to the P projectors. Conversion of bits within each group to a decimal number results in an P-tuple of indices $(\alpha_1, \alpha_2, \ldots, \alpha_P)$ where $0 \leq \alpha_i \leq 2^{N_i} - 1$, $1 \leq i \leq P$. For the purpose of converting bits within a group to a decimal number, if $1 \leq k_1, k_2, \ldots, k_{N_i} \leq m$ are the bit positions arranged in ascending order of significant bit planes, then the converted decimal number is given by $$\alpha_i = \sum_{j=0}^{N_i-1} 2^j k_{j+1}.$$

In one example, a second set of multichannel binary images $PROJ\_IMG_1', PROJ\_IMG_2', \ldots, PROJ\_IMGp'$ are projected that are "inverted" relative to the first set of multichannel binary images $PROJ\_IMG_1, PROJ\_IMG_2, \ldots, PROJ\_IMGp$. For the purpose of this disclosure, if I is an n-channel binary image, so that if x is a pixel, $I(x) \in (Z_2)^n$ is an n-dimensional binary vector, then the inverted n-channel binary image I' is defined for pixel x with an n-dimensional binary vector $-I(x) = (1, 1, \ldots, 1) + I(x)$. The measurement controller 103 calculates these inverse images and controls the projection hardware 101 to project these images in addition to projecting the first set of multichannel binary images. The measurement controller 103 also controls the multispectral camera 105 to capture the scene with the inverse images in addition to capturing the scene with the first set of multichannel binary images. The resulting multispectral image corresponds to a m-channel images CAM_IMG'. An m-channel binary image BIN_IMG can be determined by comparing CAM_IMG and CAM_IMG'. For example, for each pixel x and each channel c where $1 \leq c \leq m$, define $$BIN\_IMG(x, c) = \begin{cases} 1 & \text{if } CAM\_IMG(x, c) \geq CAM\_IMG'(x, c) \\ 0 & \text{if } CAM\_IMG(x, c) < CAM\_IMG'(x, c) \end{cases}$$

Further to the foregoing description of multispectral binary coded projection, U.S. application Ser. No. 13/839,292, filed Mar. 15, 2013 and assigned to the Applicant herein, entitled "Multispectral Binary Coded Projection" by Siu-Kei Tin, now published as U.S. Patent Application Publication No. 2014/0028800, and U.S. application Ser. No. 13/839,457, filed Mar. 15, 2013 and assigned to the Applicant herein, entitled "Multispectral Binary Coded Projection" by Siu-Kei Tin, now published as U.S. Patent Application Publication No. 2014/0028801, are incorporated herein by reference as if set forth herein in full.

Figure 2A:
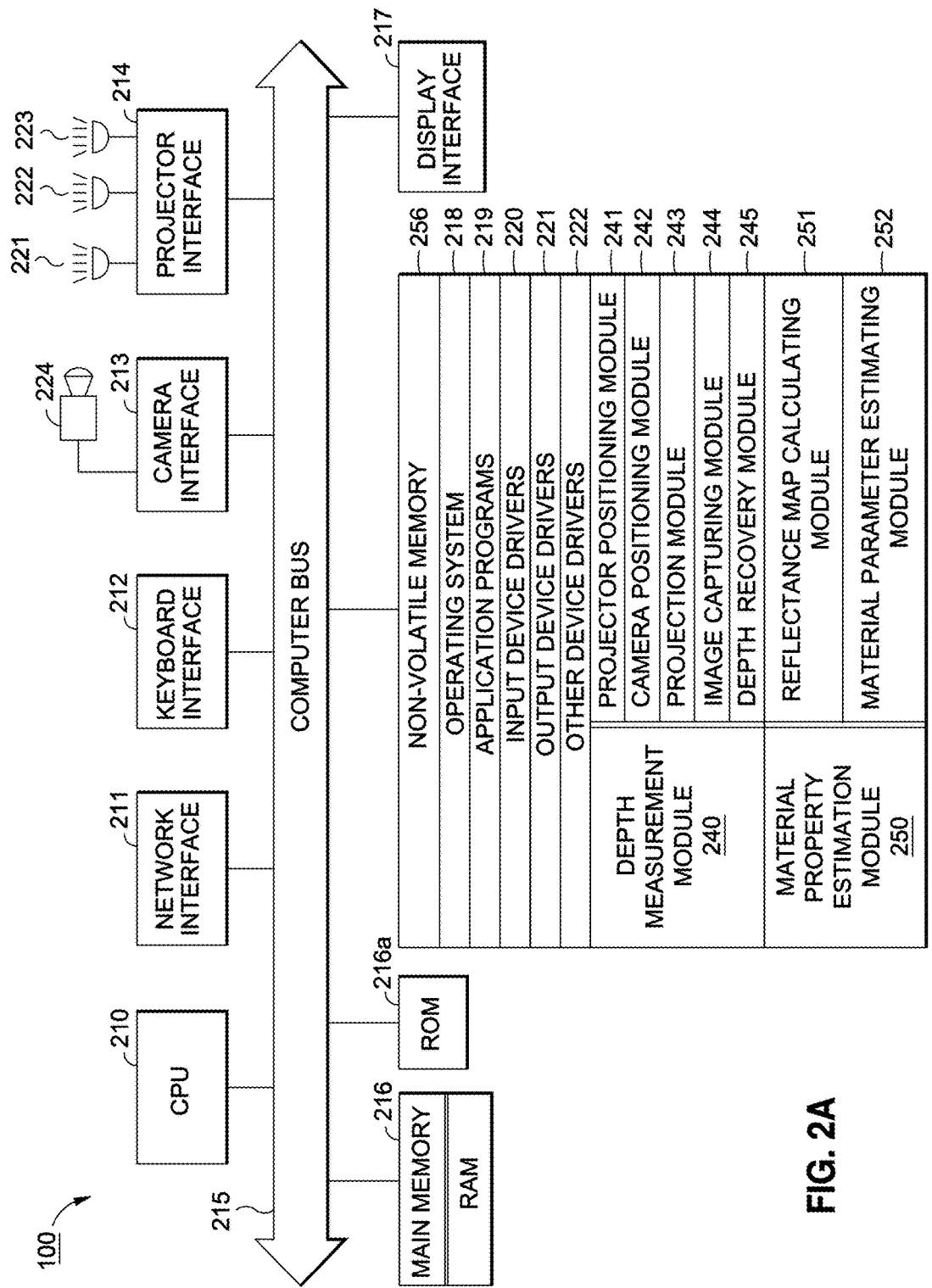
FIGS. 2A and 2B are views for explaining the architecture of a multispectral binary coded projection system according to an example embodiment.

FIG. 2A is a view for explaining the architecture of multispectral binary coded projection system 100.

As shown in FIG. 2A, multispectral binary coded projection system 100 includes central processing unit (CPU) 210, which interfaces with computer bus 215. Also interfacing with computer bus 215 are non-volatile memory 256 (e.g., a hard disk or other nonvolatile storage medium), network interface 211, keyboard interface 212, camera interface 213, random access memory (RAM) 216 for use as a main run-time transient memory, read only memory (ROM) 216a, and display interface 217 for a display screen or other output.

RAM 216 interfaces with computer bus 215 so as to provide information stored in RAM 216 to CPU 210 during execution of the instructions in software programs, such as an operating system, application programs, image processing modules, and device drivers. More specifically, CPU 210 first loads computer-executable process steps from non-volatile memory 256, or another storage device into a region of RAM 216. CPU 210 can then execute the stored process steps from RAM 216 in order to execute the loaded computer-executable process steps. Data, also, can be stored in RAM 116 so that the data can be accessed by CPU 210 during the execution of the computer-executable software programs, to the extent that such software programs have a need to access and/or modify the data.

As also shown in FIG. 2A, non-volatile memory 256 contains computer-executable process steps for operating system 218, and application programs 219, such as graphic image management programs. Non-volatile memory 256 also contains computer-executable process steps for device drivers for software interface to devices, such as input device drivers 220, output device drivers 221, and other device drivers 222.

Non-volatile memory 236 also stores a depth measurement module 240 and a material property estimation module 250. The depth measurement module 240 and the material property estimation module 250, respectively, comprise computer-executable process steps for measuring a depth map of an object, and for estimating a material property of the object based on the measured depth map.

As shown in FIG. 2A, depth measurement module 240 generally includes projection positioning module 241 for positioning multiple projectors at respectively multiple angular positions relative to an object. Each of the projectors comprises color channels whose colors differ from that of the other projectors. That is, each of the projectors comprises color channels whose colors differ from the colors of color channels of the other projectors. Also included in depth measurement module 240 is camera positioning module 242 for positioning an image capture device relative to the multiple projectors. The image capture device comprises a multispectral capture device having a capture sensitivity spectral range that includes the spectral range of the totality of colors of the multiple projectors. Additionally, projection module 243 is for projecting a first combined color pattern onto the object using the multiple projectors. Each projector projects a color striped pattern whose resolution differs from that of other projectors, and the resolution of the color striped pattern is related to the angular position of the projector. Image capture module 244 is for capturing an image of the object with the first combined color pattern using an image capture device. Depth recovery module 245 is for recovering the depth map of the object by calculations using the captured image.

Material property estimation module 250 for its part includes reflectance map calculating module 251 for determining surface normal vectors from the recovered depth map and calculating an empirical reflectance map from the determined surface normal vectors and the captured image. Material property estimation module 250 also includes material parameter estimating module 252 for fitting a reflectance model to the calculated empirical reflectance map so as to obtain an estimate of a material property parameter.

These modules will be discussed in more detail below with respect to FIG. 2B.

The computer-executable process steps for these modules may be configured as part of operating system 218, as part of an output device driver in output device drivers 221, or as a stand-alone application program. These modules may also be configured as a plug-in or dynamic link library (DLL) to the operating system, device driver or application program. It can be appreciated that the present disclosure is not limited to these embodiments and that the disclosed modules may be used in other environments.

Figure 2B:
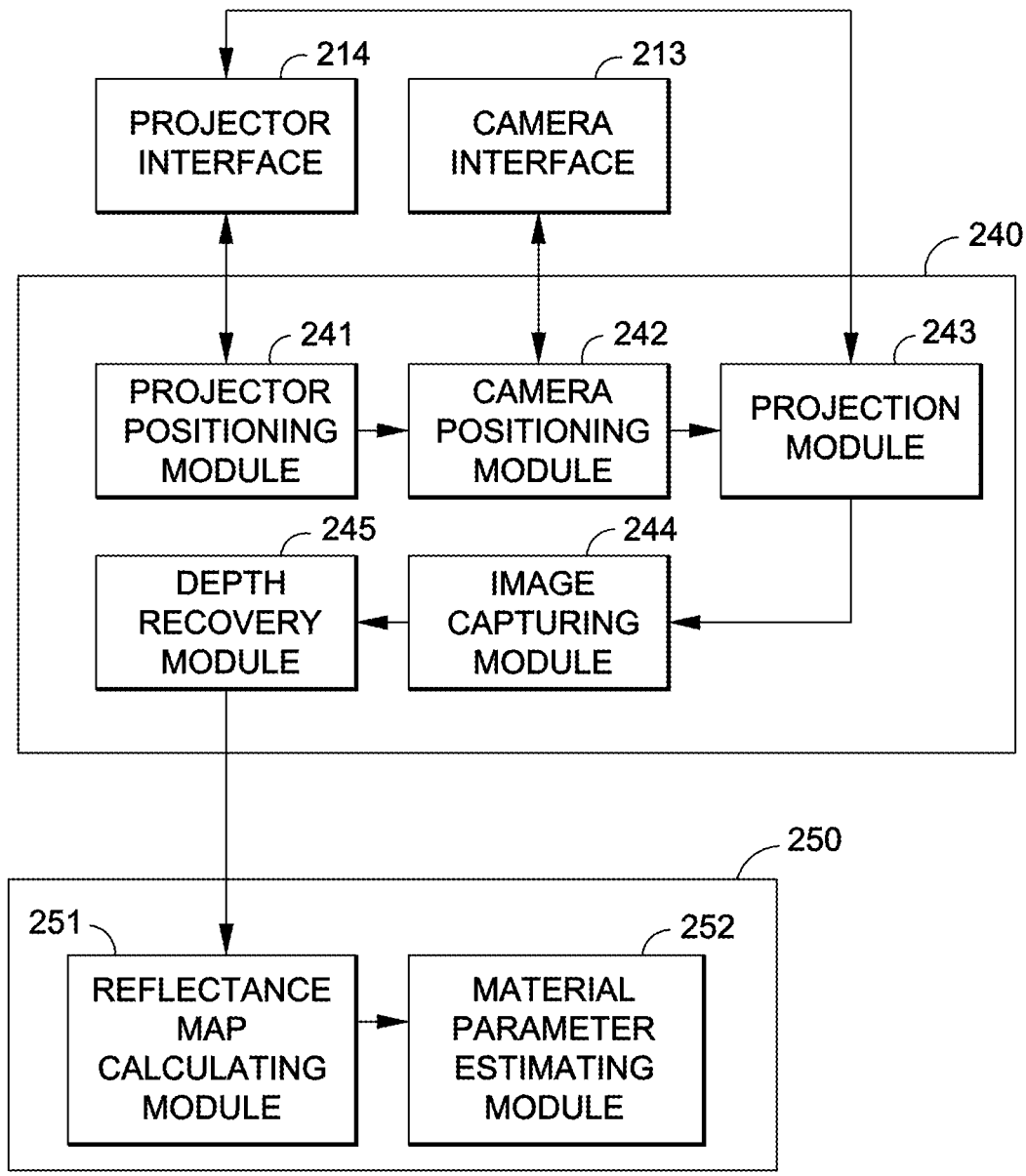

FIG. 2B is a view for explaining depth measurement module 240 and material property estimation module 250 according to an example embodiment. As previously discussed with respect to FIG. 2A, depth measurement module 240 and material property estimation module 250 each comprise computer-executable process steps stored on a non-transitory computer-readable storage medium, such as non-volatile memory 256.

As shown in FIG. 2B, depth measurement module 240 includes projector positioning module 241 for positioning multiple projectors at respectively multiple angular positions relative to an object. Camera positioning module 242 positions an image capture device relative to the multiple projectors. Positioning multiple projectors and positioning the image capture device are steps that are typically performed only once prior to first use (for example, in the factory manufacturing the apparatus). The projector positioning module 241 and camera positioning module 242 may then perform geometric and radiometric calibration of the multiple projectors and image capture device. After the calibration, the multiple projectors and image capture device are held fixed in position. Projection module 243 projects a first combined color pattern onto an object using the multiple projectors and also communicates with projector interface, which is configured to send image data to the multiple projectors. Image capture module 244 captures an image of the object with the first combined color pattern using an image capture device. The resultant image may be stored, for example in non-volatile memory 256. Depth recovery module 245 uses the image captured by image capture module 244 to recover a depth map of the object by calculations using the captured image.

Reflectance map calculating module 251 determines surface normal vectors from the depth map recovered by depth recovery module 245 and calculates an empirical reflectance map from the determined surface normal vectors and the image captured by image capture module 244. Material property estimating module 252 fits a reflectance model to the empirical reflectance map calculated by reflectance map calculating module 251 and obtains an estimate of a material property parameter. The depth map of the object, the empirical reflectance map of the object, and the estimated material property parameter of the object may all be stored with the image data, for example, in non-volatile memory 256.

Projection hardware 101 may include multiple low-number-of-channel projectors. In other words, each of $N_i(1 \leq i \leq P)$ is a small number, for example, $N_i=3$. The primaries of each of the multiple low-number-of-channel projectors can be customized so that the primaries are sufficiently spectrally distinct so that they can be spectrally "separated" by multispectral camera 105. In other words, each of the projectors comprises color channels whose colors differ from that of others of the multiple projectors.

In this regard, the naïve approach of using multiple projectors for a multispectral binary coded projection might involve simply distributing bit planes of the Gray code to the many channels of the multiple projectors. However, such an approach might not work for multispectral binary coded projection. Unless the multiple projectors are coaxial, there might be no predetermined correspondence between pixel columns of the multiple projectors. In fact, the corresponding pixel columns of the multiple projectors that would illuminate the same point of an object would depend on the depth of the object at that point, which is what the multispectral binary coded projection is intended to measure in the first place.

Figure 3:
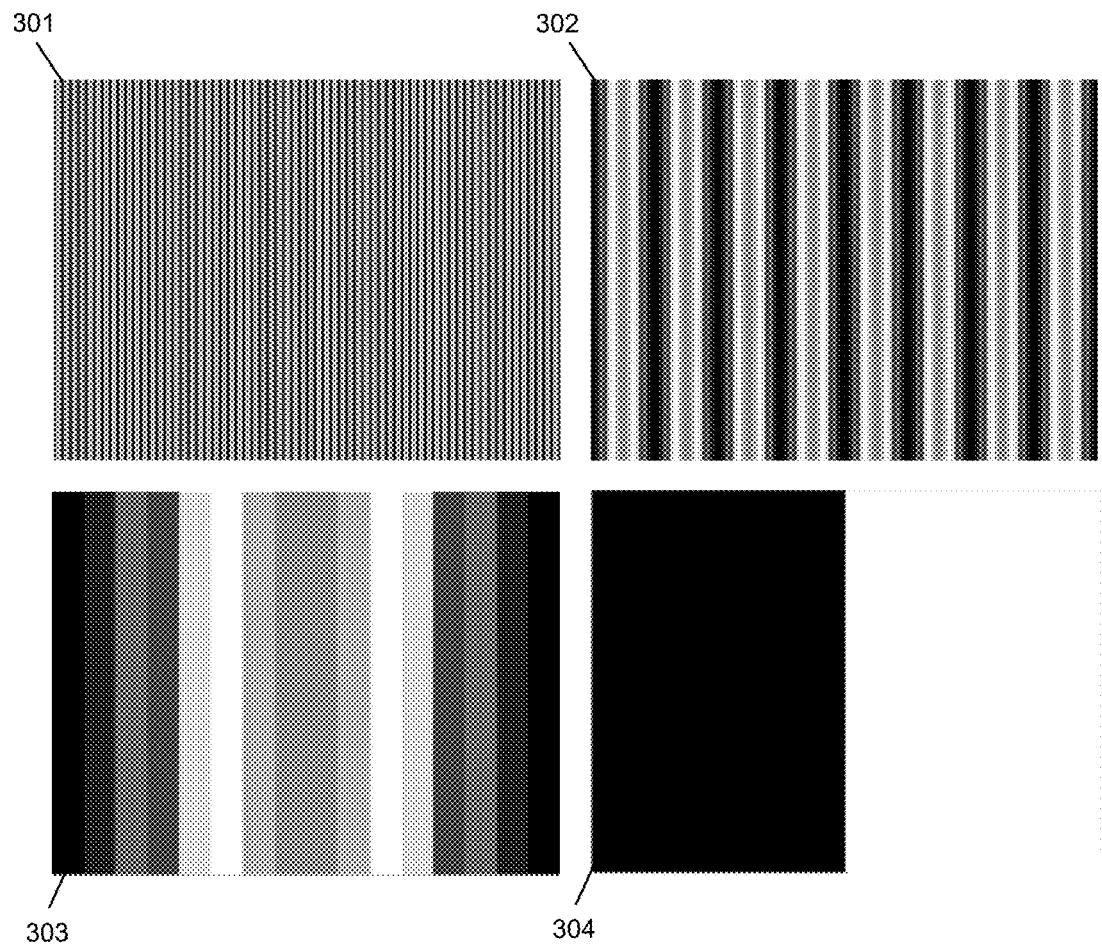
FIG. 3 is a view illustrating an example approach of distributing the bit planes of a Gray code across multiple projectors.

Additionally, if the images of each of the multiple projectors were to be processed individually, there might not be enough codes to tag each column of the projectors uniquely. FIG. 3 shows example patterns resulting from such an approach.

In FIG. 3, 10-bit Gray code patterns are separated into 4 RGB coded patterns, since 4 projectors would be needed to project 10 bit planes. Patterns 301, 302, 303 and 304 are projected by a first, second, third and fourth projector, respectively. It can be seen that, if each of the 4 projectors is processed individually, there is ambiguity in determining which pixel column of the multiple projectors causes a reflection at a particular point of a scene or object, since it is not possible to assign a unique code to each column.

Therefore, in examples provided herein, each of the multiple low-number-of-channel projectors is configured to project a color striped pattern of a different resolution onto an object. The patterns from all of the projectors are combined to form a combined color pattern and an image of the object with the combined color pattern is used to calculate a depth map for an object and, in turn, to estimate a material property of the object.

Figure 4:
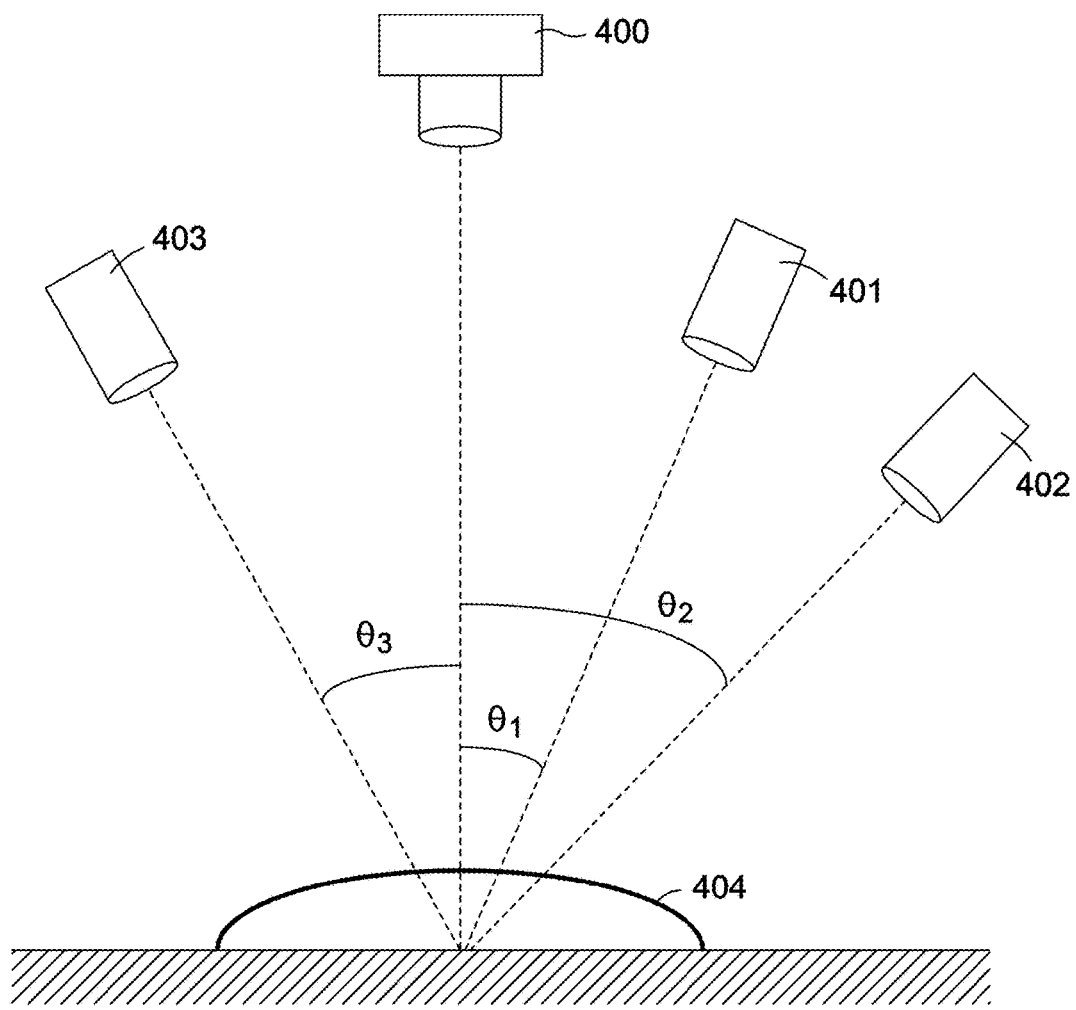
FIG. 4 is a view illustrating a binary coded projection system using multiple projectors according to an example embodiment.

FIG. 4 is a view illustrating a multispectral binary coded projection system using multiple projectors according to an example embodiment. The example setup includes a multispectral camera 400 and three low-number-of-channel projectors 401, 402 and 403. Object 404 is the object to be measured and $\theta_1$, $\theta_2$, and $\theta_3$ are the angles between the optical axes of multispectral camera 400 and each of projectors 401, 402 and 403 respectively. In some embodiments, the multispectral camera 400 is an orthographic camera equipped with a telecentric lens or other optical elements that make the camera orthographic, and the low-number-of-channel projectors 401, 402 and 403 are orthographic projectors equipped with telecentric lenses or other optical elements that make the projectors orthographic. It should be noted that other configurations are possible and the number of projectors is not limited to three and the number of multispectral cameras is not limited to one.

In example embodiments provided herein, the angular positions $\theta_1$, $\theta_2$, and $\theta_3$ of the projectors relative to the multispectral camera 400 is determined based on the resolution of the pattern projected by each of the multiple projectors 401, 402 and 403.

Figure 5:
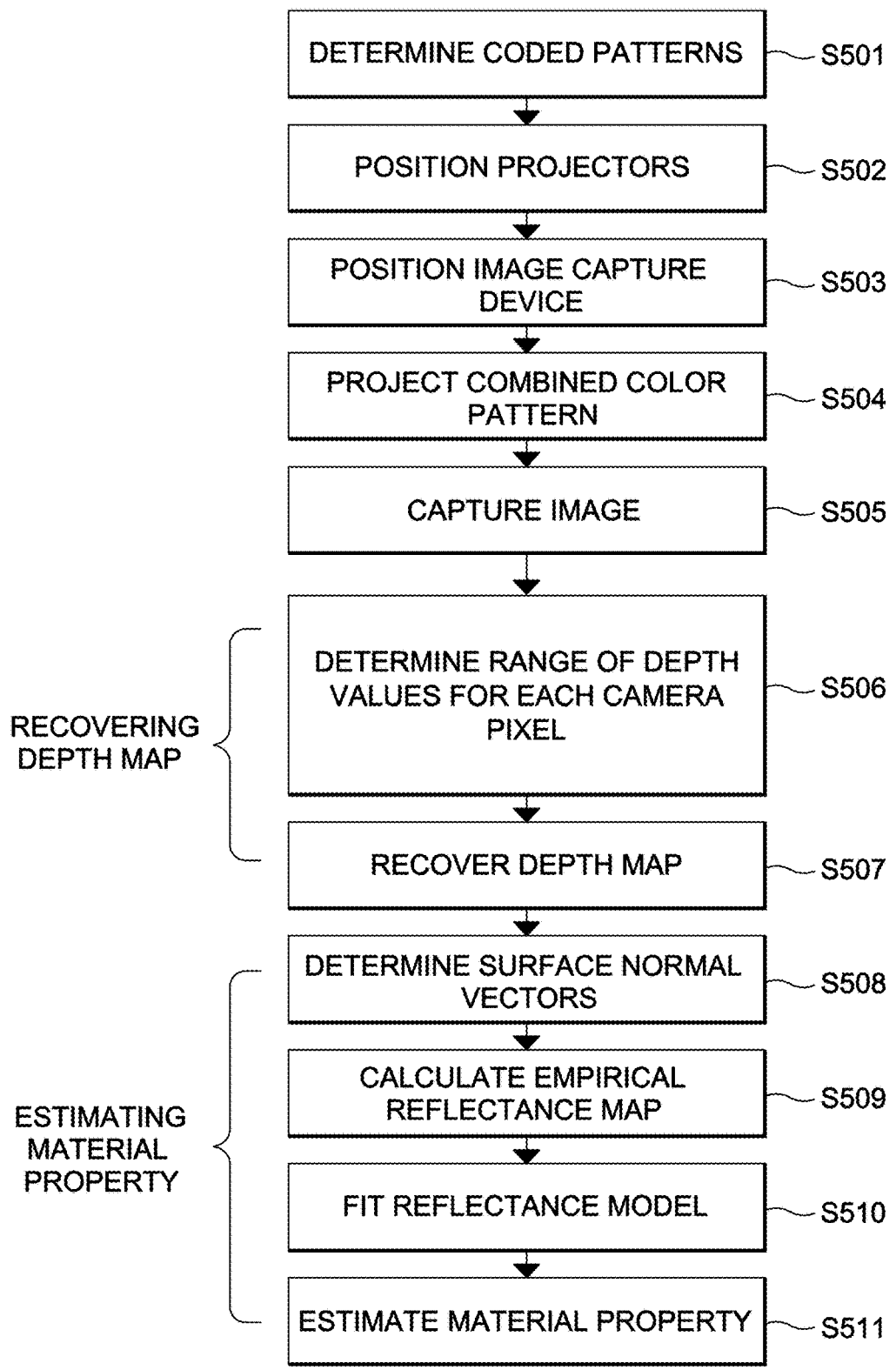
FIG. 5 is a flow diagram for explaining a process for measuring a depth map of an object and estimating a material property of the object using multispectral binary coded projection with multiple projectors.

FIG. 5 is a flow diagram of a process for measuring a depth map of an object and estimating a material property of the object using multispectral binary coded projection with multiple projectors, according to such example embodiments.

Briefly, in FIG. 5, multichannel binary coded patterns for multiple projectors are determined. Multiple projectors are positioned at respectively multiple angular positions relative to an object, and each of the projectors comprises color channels whose colors differ from that of others of the multiple projectors. An image capture device is positioned relative to the multiple projectors, and the image capture device comprises a multispectral capture device having a capture sensitivity spectral range that includes the spectral range of the totality of colors of the multiple projectors. A first combined color pattern is projected onto the object using the multiple projectors, and each projector projects a color striped pattern whose resolution differs from that of the other projectors and the resolution of the color striped pattern is related to the angular position of the projector. An image of the object is captured with the first combined color pattern using the image capture device and a depth map of the object is recovered by calculations using the captured image.

In step S501, the multichannel binary coded patterns are determined, as explained in the following.

In an example embodiment, P projectors are used, where the ith projector has $N_i$ channels and a pixel resolution of $r_i$. In some examples, binary patterns with vertical stripes are projected from each projector. In other examples, the binary patterns are made of horizontal stripes. In examples where binary patterns of vertical stripes are used, $r_i$ refers to the horizontal pixel resolution of each projector. In examples where binary patterns of horizontal stripes are used, $r_i$ refers to the vertical pixel resolution of each projector.

In one example embodiment, all projectors have 3 channels and the same horizontal pixel resolution $r_i$=1024 pixels.

Referring again to FIG. 4, the angles $\theta_1$, $\theta_2$, and $\theta_3$ are the angles between the optical axes of the multispectral camera 400 and projectors 401, 402 and 403 respectively. A small angle generally leads to a higher triangulation error, or depth error, while a large angle means that the multispectral camera 400 and the respective projector have significantly different viewpoints, which can result in holes in the resulting depth map. Example embodiments provided herein balance a tradeoff of these two conflicting effects by implementing camera-projector systems that use moderate angles.

In order to explain the design of the binary coded patterns, FIG. 6 shows an embodiment with 3-channel projectors each of which is only capable of projecting only 8 ($=2^3$) distinct codes. It is generally not possible to uniquely tag each pixel column of a projector of a relatively high resolution, such as 1024 pixels of horizontal pixel resolution. Example embodiments described herein resolve this difficulty by using binary coded patterns that are color striped patterns, such that the color striped pattern for each projector has a different resolution than that of others of the multiple projectors.

Informally, each projector is responsible for a different precision level. A first projector is responsible for a coarsest precision level. Continuing with the example embodiment of FIG. 6, if 3-channel projectors are used, the coarsest precision has only 8 levels, such that a 3-bit binary code, such as Gray code, is sufficient. For an example in which 3-channel projectors having a resolution of 1024 pixels are used, a 3-bit Gray code can be used by projecting a first pattern of stripes onto an object, where each stripe has a pixel width of 128. In other words, the minimum stripe width of the pattern is 128 pixels and it characterizes the resolution of the striped pattern, which is the coarsest resolution in this case.

The uncertainty or error in depth measurement resulting from the first projector of coarsest precision level is reduced in the next precision level, which is designated to the second projector. From the second projector of higher precision level, a second pattern is projected onto the object which includes periodic repetitions of a basic 8 stripes. The second pattern is such that the pixel width of each stripe of the second pattern is smaller than the pixel width of stripes of the first pattern. In other words, the minimum stripe width is smaller, resulting in a stripe pattern of a higher resolution. Furthermore, a stripe of the first pattern on the object surface is contained in a full period of 8 stripes of the second pattern. This allows for a stripe in the second pattern to be identified without ambiguity.

A third projector then provides the highest precision level. From the third projector, a third pattern is projected onto the object which also includes periodic repetitions of a basic 8 stripes. The third pattern is such that the pixel width of each stripe of the third pattern is smaller than the pixel width of stripes of the second pattern. In other words, the minimum stripe width is smallest, resulting in a stripe pattern of the highest resolution among the three projectors. Furthermore, a stripe of the second pattern is contained in a full period of 8 stripes of the third pattern.

To formalize the above description, the general case of P projectors can be considered to include projectors with a respective number of channels $N_1, \ldots, N_P$ and pixel resolutions $r_1 \ldots, r_P$.

Figure 7A:
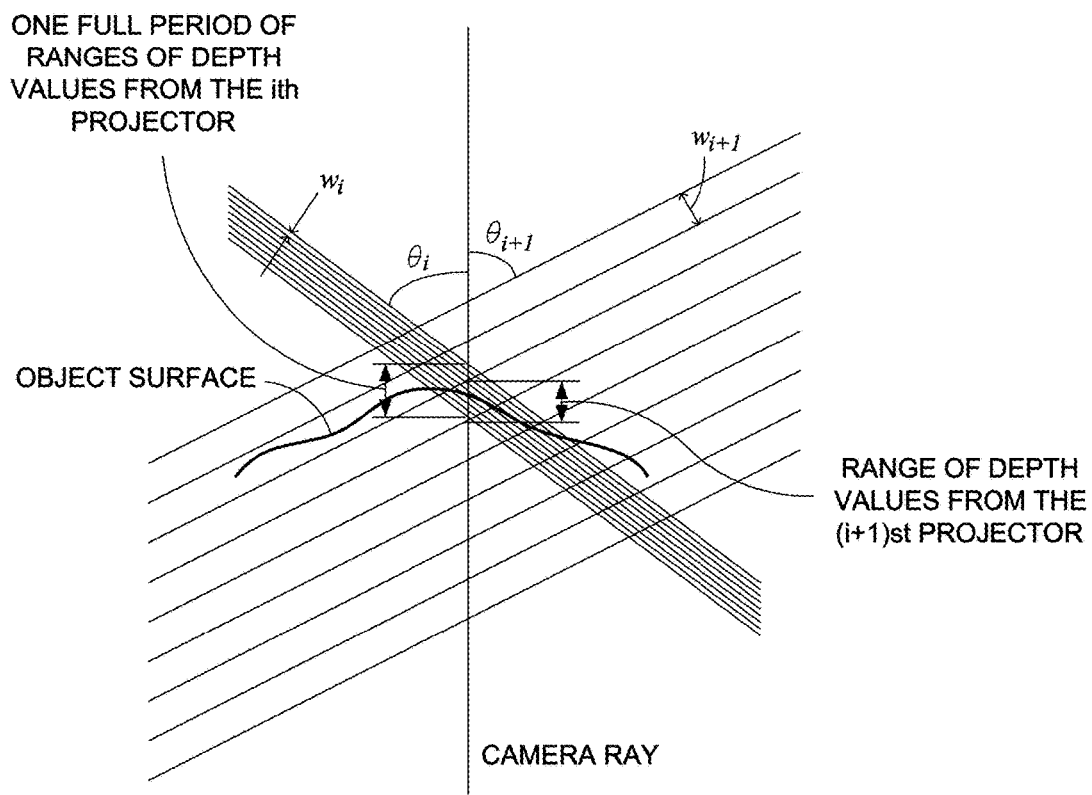
FIGS. 7A and 7B are illustrations of the relationship between stripe patterns for an ith and (i+1)th projector according to an example embodiment.

FIG. 7A is an illustration of the relationship between stripe patterns for the ith and (i+1)th projector, in an embodiment where both the camera and the projectors are orthographic. In some embodiments, both the camera and the projectors may be equipped with telecentric lenses. As shown, each projector is at a different angle $\theta_i$ from the camera viewing direction, and one full period of ranges of depth values from the ith projector contains completely a range of depth values from the (i+1)th projector. More specifically, for a given pixel in the sensor plane of the camera, a camera ray may be defined as a line emanating from the pixel through the aperture of the camera along the viewing direction. Periodic color striped pattern projected by a projector then partitions depth values along the camera ray into periods of ranges of depth values. As shown in FIG. 7, the size of a range of depth values for the ith projector, which is a measure of precision of depth measurement, is related to the minimum stripe width $w_i$. Incidentally, the resolution of a color striped pattern is characterized by the minimum stripe width such that a small minimum stripe width corresponds to a high resolution pattern and a large minimum stripe width corresponds to a low resolution pattern.

It can be seen from FIG. 7A that, in order to avoid ambiguity in determining the range of depth values for the ith projector that includes the object surface point being measured, the following condition must be imposed:

$$\frac{w_{i+1}}{\sin\theta_{i+1}} \leq \frac{w_i}{\sin\theta_i} \cdot 2^{N_i}$$

where $w_i$ is the minimum stripe width of the ith projector. $w_{i+1}$ is the minimum stripe width of the (i+1th) projector. $\theta_i$ is the angle between the ith projector and the viewing direction of the multispectral camera. $\theta_{i+1}$ is the angle between the (i+1th) projector and the viewing direction of the multispectral camera. $N_i$ is the number of channels of the ith projector.

The foregoing condition provides a set of design parameters for the patterns of each projector. In the example embodiment in which 3-channel projectors, each of horizontal pixel resolution 1024 pixels, are used, that is, $P=3, N_1=N_2=N_3=3, r_1=r_2=r_3=1024$, the first projector is designated for the highest precision level, the second projector is designated for a medium precision level and the third projector is designated for the coarsest precision level. To make full use of the resolution of the first projector, the boundary condition $w_1=1$ is set. In other words, each stripe of the pattern projected by the first projector is 1 pixel wide. This results in the following design condition:

$$w_2 \leq \frac{\sin\theta_2}{\sin\theta_1} \cdot 8$$

where $w_2$ is the stripe width of the second projector. $\theta_2$ is the angle between the second projector and the viewing direction of the multispectral camera. $\theta_1$ is the angle between the first projector and the viewing direction of the multispectral camera.

In order to have more choices for the pixel width $w_2$, the angle between the first projector and the multispectral camera $\theta_1$ can be chosen to be smaller than the angle between the second projector and the multispectral camera $\theta_2$. For example, if $\theta_1=15°$ and $\theta_2=40°$, $w_2 \leq 19.87$. Accordingly, a pixel width of $w_2=16$ can be chosen.

Similarly, if $\theta_3=45°$, the following design condition applies:

$$w_3 \leq \frac{\sin 45°}{\sin 40°} \cdot 16 \cdot 8 = 140.81$$

where $w_3$ is the stripe width of the third projector.

Since the third projector is the last projector, another boundary condition of $w_3 \cdot 2^{N_3} \geq r_3$ or $w_3 \cdot 8 \geq 1024$ applies. This ensures that the coarsest precision level, designated to the third projector, can be determined without ambiguity by using a 3-bit Gray code. Both conditions are satisfied by selecting $w_3=128$.

In summary, for the embodiment of three 3-channel projectors, the first projector projects a highest resolution pattern with a minimum stripe width of 1 pixel at an angle of 15 degrees to the camera, the second projector projects a next highest resolution pattern with a minimum stripe width of 16 pixels at an angle of 40 degrees to the camera, and the third projector projects a lowest resolution pattern with a minimum stripe width of 128 pixels at an angle of 45 degrees. Thus, the resolution of a color striped pattern is characterized by a minimum stripe width such that a small minimum stripe width corresponds to a high resolution pattern and a large minimum stripe width corresponds to a low resolution pattern, and the resolution of the color striped pattern a projector projects is related to the angular position of the projector, which may be inversely related to the angle between the projector and the camera.

Returning to the general case, to summarize, the minimum stripe widths of the projection patterns and the angular positioning of the multiple projectors, according to example embodiments of the invention, can be determined by satisfying the following recursive conditions:

$$w_1 = 1$$

$$w_{i+1} \leq 2^{N_i} w_i \frac{\sin \theta_{i+1}}{\sin \theta_i}, i = 1, 2, \ldots, P-1$$

$$w_P \geq \frac{r_P}{2^{N_P}}$$

Figure 9:
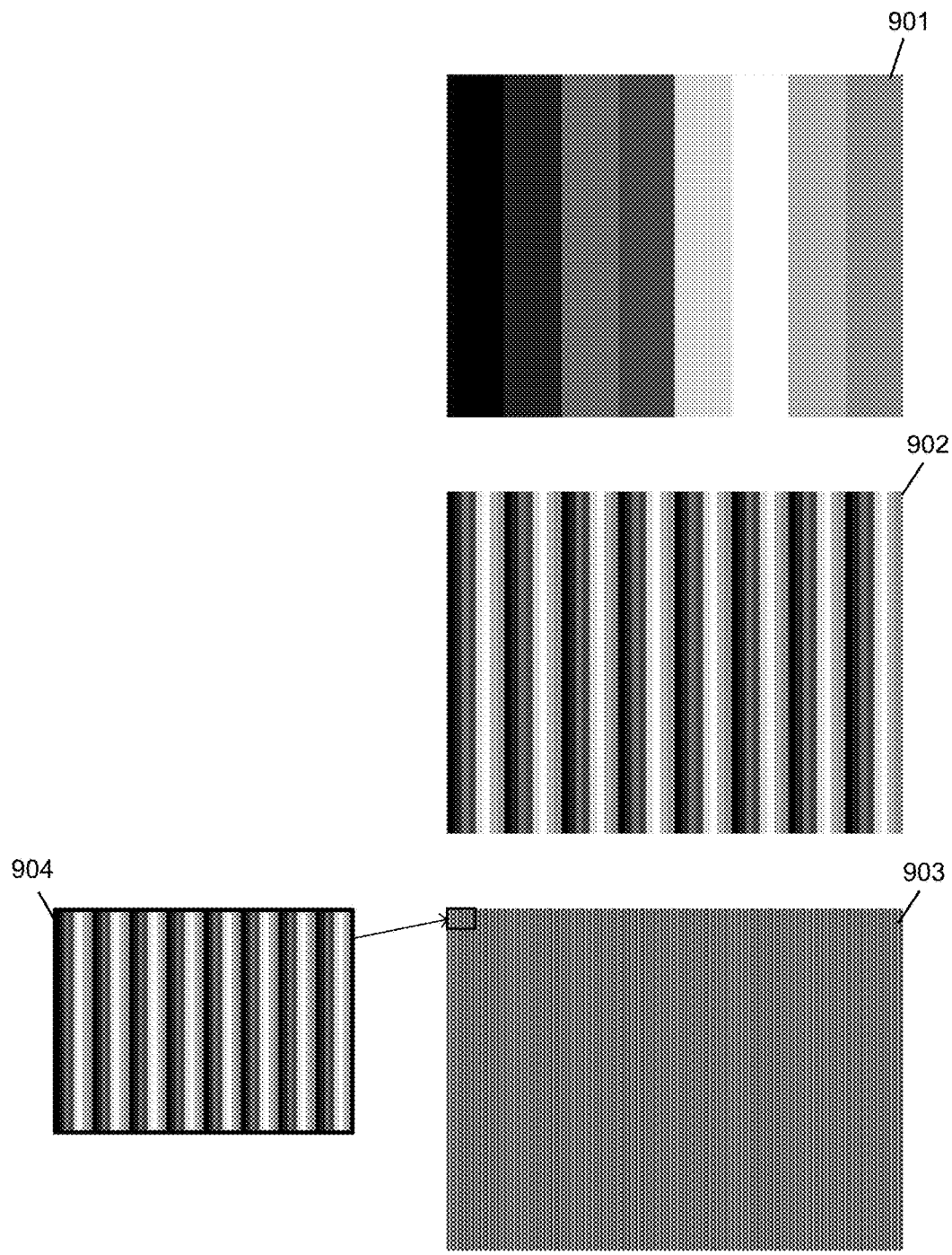
FIG. 9 is an illustration of design choices for patterns of a three 3-channel projector system according to an example embodiment.

FIG. 9 is an illustration of design choices for patterns of a three 3-channel projector system, according to an example embodiment. A first pattern of highest resolution of minimum stripe width 1 pixel from a first projector is shown as 903, a second pattern of medium resolution of minimum stripe width of 16 pixels from a second projector is shown as 902 and a third pattern of lowest resolution of minimum stripe width of 128 pixels from a third projector of highest precision level is shown as 901. 904 is a magnified view of part of pattern 903. The coded patterns are periodic repetitions of the 3-bit Gray code, that is, the 8-element sequence 0, 1, 3, 2, 6, 7, 5, 4.

Figure 8:
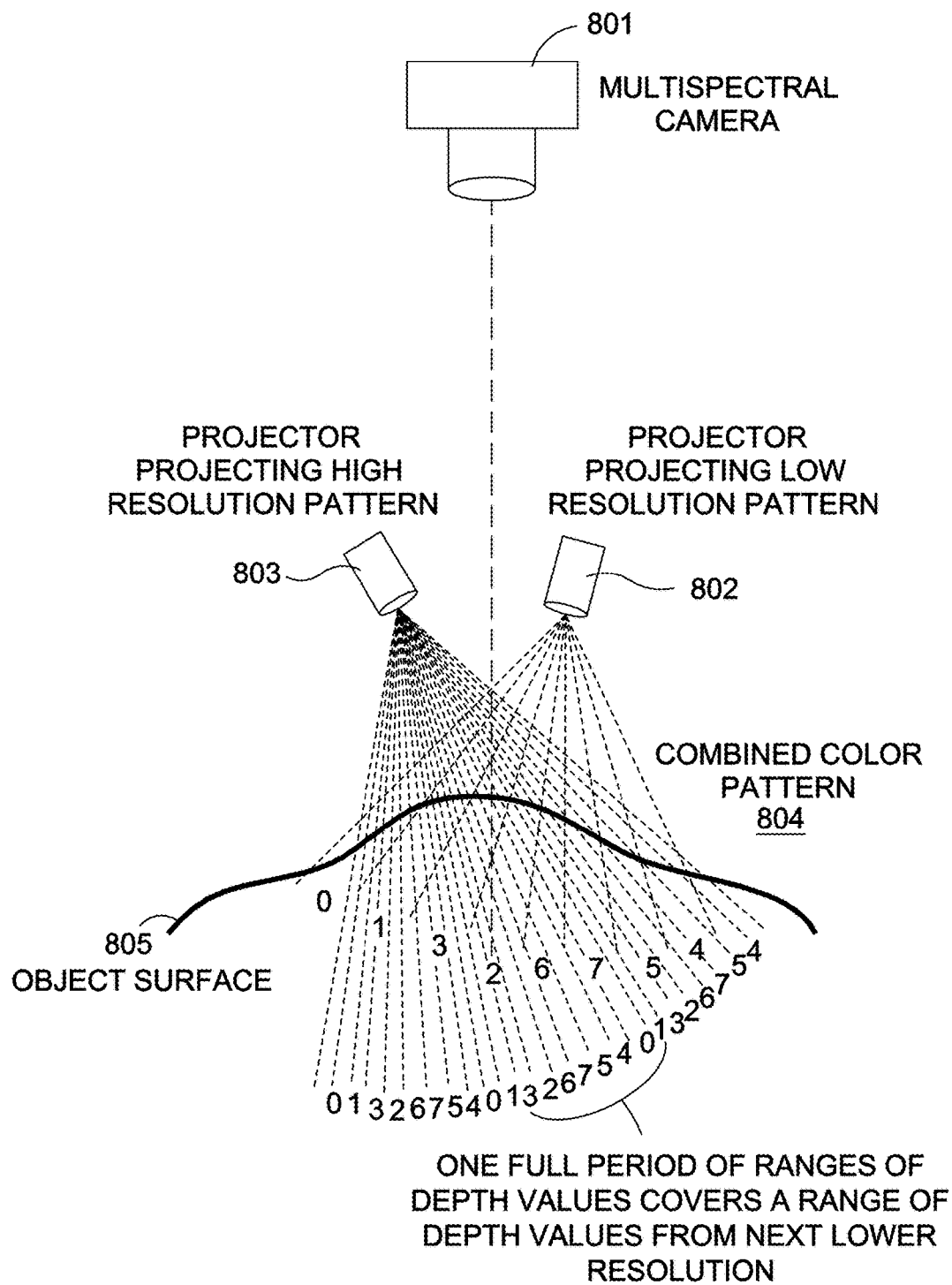
FIG. 8 is an illustration of the relationship between stripe patterns of two projectors according to an example embodiment.

FIG. 8 provides an illustration of projection of stripe patterns using perspective projectors (instead of orthographic projectors) according to an example embodiment. In FIG. 8, perspective projector 802 projects a lower resolution pattern while perspective projector 803 projects a higher resolution pattern. The two projectors are positioned at different angular positions with respect to the viewing direction of multispectral camera 801. Combined color pattern 804 is produced by the combination of stripe patterns projected by each projector. As shown, one full period of ranges of depth values by the periodic color striped pattern of projector 803 covers a range of depth values by the periodic color striped pattern of projector 802. In other words, similar to the case of orthographic projectors and orthographic camera, for the case of perspective projectors and perspective camera, each projector projects a periodic color striped pattern that partitions depth values along a line emanating from the camera into periods of ranges of depth values, in which a range of depth values for a projector projecting a periodic color striped pattern is contained in a full period of ranges of depth values for one of the other projectors projecting a periodic color striped pattern at a higher resolution.

Referring to FIG. 5, once the angular positions of the projectors and the multispectral camera have been determined, for example, using the foregoing recursive conditions, the projectors and camera can be positioned in steps S502 and S503. Positioning the projectors and camera may include determining (e.g. calculating) the desired positions of the projectors and cameras. Positioning the projectors and camera may include physically moving or fixing the projectors and cameras to a desired positioning. In other examples, positioning the projectors and camera may include accepting an input of a desired positioning of the projectors and cameras and physically moving or fixing the projectors and cameras based on the accepted input.

In step S504, the color striped patterns, one from each projector, are then projected simultaneously onto an object to form a combined color pattern. In some example embodiments, a second combined color pattern is projected onto the object in a similar manner to the first combined color pattern so as to provide additional data for recovering depth measurements. The second combined color pattern may, for example, be inverted in color values relative to the first combined color pattern.

In step S505, an image of the combined color pattern is captured by multispectral camera 105. As mentioned above, the captured image has multiple channels and is captured synchronously with the projection of the combined color pattern.

In steps S506 and S507, a depth map is recovered from the captured image.

Figure 7B:
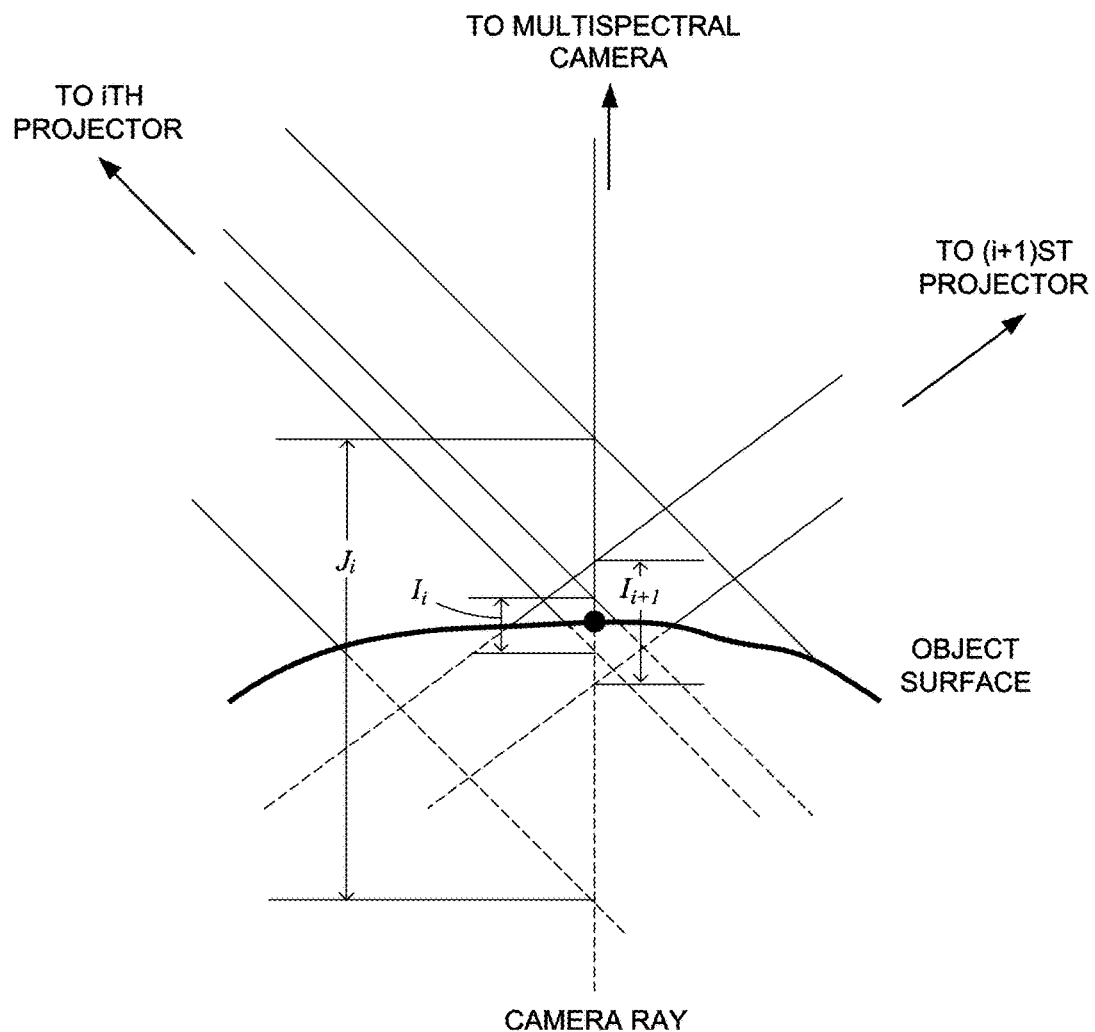

Referring to FIG. 7B, in step S506, for each pixel in the captured multispectral image, a range of depth values corresponding to a stripe position in the projector projecting the highest resolution color striped pattern is determined. A camera ray is constructed that is a line emanating from a given camera pixel q which can be fixed for this description. As before, the general case of P projectors can be considered with each projector having a respective number of channels $N_1, \ldots, N_P$ and pixel resolutions $r_1, \ldots, r_P$. Then the range of depth values for camera pixel q corresponding to a stripe position in the projector projecting the highest resolution color striped pattern, that is the first projector, is denoted $I_1$. This range of depth values is determined recursively by determining a range of depth values corresponding to a stripe position in a projector projecting a lower resolution color striped pattern. In other words, to determine $I_1$, $I_P$ is determined and then and by recursion, $I_1$ is calculated. It is assumed the binary codes $c_1, c_2, \ldots, c_P$, one for each projector, have been recovered from the multispectral camera image, for example, using a method of binarization described before. By choice of the minimum stripe width $w_P$ for the Pth projector, the $N_P$-bit code $c_P$ uniquely identifies $I_P$. By recursion then, if it is known how to determine $I_i$, once $I_{i+1}$ is determined, $I_1$ can eventually be determined. Because $I_{i+1}$ is contained in a known full period J of ranges of depth values for the ith projector, in combination of the information provided by the binary code $c_i$, the range $I_i$ of depth values can be determined, which is one of the ranges of depth values in the period $J_i$ that is uniquely identified by the binary code $c_i$. This argument is applied recursively until $I_1$ is determined.

In step S507, a depth map is recovered by first determining a range of depth values above) for each camera pixel q as described in step S506. The actual depth map, which is a depth value for each camera pixel q, is taken to the average of a range of depth values for each camera pixel, that is, the mid-point of a range of depth values for each camera pixel.

Figure 10:
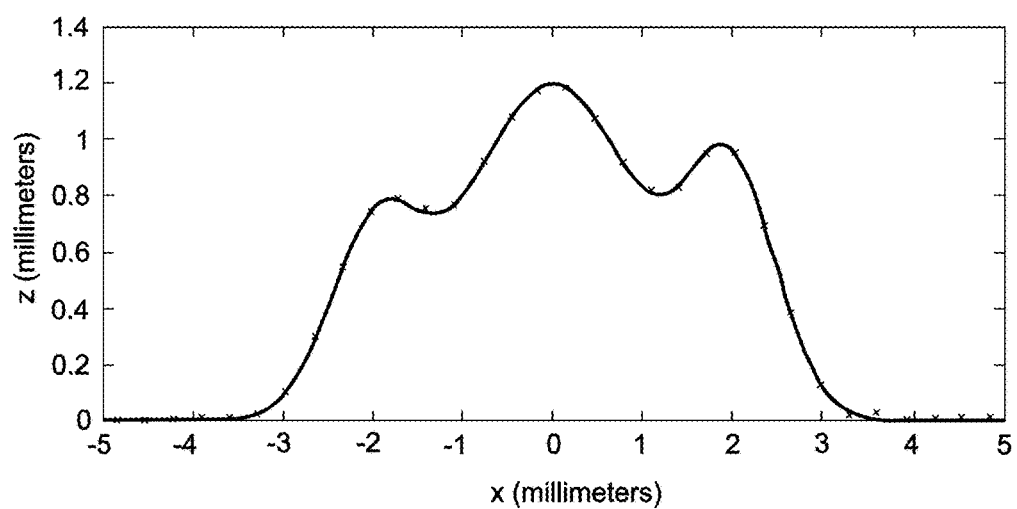
FIG. 10 is a plot of example results of a depth estimation according to an example embodiment.

FIG. 10 is a plot of example results of depth estimation showing 32 sample locations, or camera pixels, denoted by 'x', and a ground truth surface profile, denoted by the solid curve. In the example of FIG. 10, the projectors each have a pixel pitch of 10 microns and the projector projecting a highest resolution pattern is at an angle of 15° from the camera. The depth uncertainty in this example is $0.5 \cdot 10 \cdot 10^{-3}/\sin 15°$, or 0.019 mm.

In some embodiments, a material property of an object is further estimated from the recovered depth map by determining surface normal vectors from the depth map (step S508), calculating an empirical reflectance map from the determined surface normal vectors and captured images (step S509), and fitting a reflectance model to the calculated empirical reflectance map (step S510) so as to obtain an estimate of a material property parameter (step S511).

In step S508, surface normal vectors are determined from the depth map. In some embodiments, this can be determined from the already determined depth map. In some embodiments, the surface normal map is not determined based on the depth map. Instead, a photometric stereo method, perhaps using an entirely independent illumination and/or camera system, is used to determine the surface normal vectors directly, and one or more projectors or illumination sources may be used.

When both the depth map and the surface normal map are determined, a local reflectance map for each wavelength $\lambda_i$ can be calculated in step S509. In step S509, the local reflectance map for each wavelength $\lambda_i$ is calculated based on the 3D position and surface normal vector of a scene point, as well as the values of the one or more captured images at a pixel corresponding to the scene point.

In step S510, a reflectance property is calculated from local reflectance values in the local reflectance map by fitting them to a global reflectance model. One such model is a constant global reflectance model. Another such model is an analytical BRDF (bidirectional reflectance distribution function) model, which more accurately is actually a family of models providing an abundance of analytic BRDF models.

In step S511, the parameters resulting from the fitting of a global reflectance model to the reflectance map can then be used to estimate a material property parameter.

Further examples of a global reflectance model include a BTF (bidirectional texture function) model or a BSSRDF (bidirectional surface scattering reflectance distribution function) model. Generally, it is preferred for the global reflectance model to be an analytical model with a few parameters for fitting to.

Contrary to conventional spectroscopy or imaging spectroscopy, embodiments of the multispectral binary coded projection system described herein enable real-time determination of material properties by capturing very few (1 or 2) multispectral images.

Other Embodiments

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

The invention claimed is:

1. A method of measuring a depth map for an object, comprising:

positioning multiple projectors at respectively multiple angular positions relative to the object, wherein each of the projectors comprises color channels whose colors differ from that of others of the multiple projectors;

positioning an image capture device relative to the multiple projectors, wherein the image capture device comprises a multispectral capture device having a capture sensitivity spectral range that includes the spectral range of the totality of colors of the multiple projectors;

projecting a first combined color pattern onto the object using the multiple projectors, wherein each projector projects a color striped pattern whose resolution differs from that of others of the projectors, and wherein the resolution of the color striped pattern is related to the angular position of the projector and is characterized by a minimum stripe width such that a small minimum stripe width corresponds to a high resolution pattern and a large minimum stripe width corresponds to a low resolution pattern;

capturing an image of the object with the first combined color pattern using the image capture device; and recovering the depth map of the object by calculations using the captured image.

2. The method according to claim 1, wherein the resolution of the color striped pattern a projector projects is inversely related to the angle between the projector and the camera.

3. A method of measuring a depth map for an object, comprising:

positioning multiple projectors at respectively multiple angular positions relative to the object, wherein each of the projectors comprises color channels whose colors differ from that of others of the multiple projectors;

positioning an image capture device relative to the multiple projectors, wherein the image capture device comprises a multispectral capture device having a capture sensitivity spectral range that includes the spectral range of the totality of colors of the multiple projectors;

projecting a first combined color pattern onto the object using the multiple projectors, wherein each projector projects a color striped pattern whose resolution differs from that of others of the projectors and wherein the resolution of the color striped pattern is related to the angular position of the projector;

capturing an image of the object with the first combined color pattern using the image capture device;

projecting a second combined color pattern onto the object using the multiple projectors, the second combined color pattern differing from the first combined color pattern, wherein each projector projects a color striped pattern whose resolution differs from that of others of the projectors and wherein the resolution of the color striped pattern is related to the angular position of the projector;

capturing a second image of the object illuminated by the second combined color pattern by using the image capture device; and recovering the depth map of the object by analyzing the captured first image and the captured second image.

4. The method according to claim 3, wherein the second combined color pattern is inverted in color values relative to the first combined color pattern.

5. The method according to claim 1, wherein each projector projects a periodic color striped pattern that partitions depth values along a line emanating from the image capture device into periods of ranges of depth values, and wherein a range of depth values for a projector projecting a periodic color striped pattern is contained in a full period of ranges of depth values for one of the other projectors projecting a periodic color striped pattern at a higher resolution.

6. The method according to claim 5, wherein the depth map of the object is recovered by determining a range of depth values corresponding to a stripe position in the projector projecting the highest resolution color striped pattern.

7. The method according to claim 6, wherein determining a range of depth values corresponding to a stripe position in the projector projecting the highest resolution color striped pattern includes recursively determining a range of depth values corresponding to a stripe position in a projector projecting a lower resolution color striped pattern.

8. The method according to claim 1, wherein the multiple projectors include at least first, second and third projectors, wherein the first projector comprises spectrally relatively narrow color channels with at least three characteristic peak wavelengths $\lambda_1$, $\lambda_2$, $\lambda_3$, the second projector comprises spectrally relatively narrow color channels with at least three characteristic peak wavelengths $\lambda_4$, $\lambda_5$, $\lambda_6$, the third projector comprises spectrally relatively narrow color channels with at least three characteristic peak wavelengths $\lambda_7$, $\lambda_8$, $\lambda_9$, and all of the $\lambda_i$'s are different, and wherein the image capture device comprises at least nine color channels each with spectrally relatively broad capture sensitivity such that the combined capture sensitivity spectral range for all the color channels includes all of the $\lambda_i$'s.

9. The method according to claim 1, further comprising estimating a material property of the object from the recovered depth map by determining surface normal vectors from the depth map, calculating an empirical reflectance map from the determined surface normal vectors and the captured image, and fitting a reflectance model to the calculated empirical reflectance map so as to obtain an estimate of a material property parameter.

10. The method according to claim 9, wherein the reflectance model being fitted is a bidirectional reflectance distribution function (BRDF) model, and wherein a fitted model parameter of the BRDF model provides an estimate of a material property of the object.

11. A system for measuring a depth map for an object comprising:

a projector positioning unit constructed to fix multiple projectors at respectively multiple angular positions relative to the object, wherein each of the projectors comprises color channels whose colors differ from that of others of the multiple projectors;

a camera positioning unit constructed to fix a position of an image capture device relative to the multiple projectors, wherein the image capture device comprises a multispectral capture device having a capture sensitivity spectral range that includes the spectral range of the totality of colors of the multiple projectors;

a projection unit constructed to project a first combined color pattern onto the object using the multiple projectors, wherein each projector projects a color striped pattern whose resolution differs from that of others of the projectors, and wherein the resolution of the color striped pattern is related to the angular position of the projector and is characterized by a minimum stripe width such that a small minimum stripe width corresponds to a high resolution pattern and a large minimum stripe width corresponds to a low resolution pattern;

an image capturing unit constructed to capture an image of the object with the first combined color pattern using the image capture device; and a depth recovery unit constructed to recover the depth map of the object by calculations using the captured image.

12. A non-transitory computer-readable storage medium storing a program for causing a computer to implement the method according to claim 1.

13. A non-transitory computer-readable storage medium storing a program for causing a computer to implement the method according to claim 3.

14. A system for measuring a depth map for an object, comprising:
- a projector positioning unit constructed to fix multiple projectors at respectively multiple angular positions relative to the object, wherein each of the projectors comprises color channels whose colors differ from that of others of the multiple projectors;
- a camera positioning unit constructed to fix a position of an image capture device relative to the multiple projectors, wherein the image capture device comprises a multispectral capture device having a capture sensitivity spectral range that includes the spectral range of the totality of colors of the multiple projectors;
- a projection unit constructed to project a first combined color pattern and a second combined color pattern onto the object using the multiple projectors,
    wherein for the first combined color pattern, each projector projects a color striped pattern whose resolution differs from that of others of the projectors, and wherein the resolution of the color striped pattern is related to the angular position of the projector, and
    wherein for the second combined color pattern, the second combined color pattern differs from the first combined color pattern, and each projector projects a color striped pattern whose resolution differs from that of others of the projectors, and wherein the resolution of the color striped pattern is related to the angular position of the projector;
- an image capturing unit constructed to capture a first image of the object with the first combined color pattern using the image capture device, and further constructed to capture a second image of the object illuminated by the second combined color pattern by using the image capture device; and
- a depth recovery unit constructed to recover the depth map of the object by analyzing the captured first image and the captured second image.

* * * * *